United States Patent [19]

Zotto

[11] Patent Number: 4,781,973

[45] Date of Patent: Nov. 1, 1988

[54] FABRIC COATING

[75] Inventor: Anthony A. Zotto, Troy, N.Y.

[73] Assignee: General Electric Company, Waterford, N.Y.

[21] Appl. No.: 112,209

[22] Filed: Oct. 22, 1987

[51] Int. Cl.$^4$ ................................................ B32B 7/00
[52] U.S. Cl. .................................... 428/266; 427/387; 428/447; 525/100; 525/477; 528/12; 528/14; 528/15; 528/16; 528/17; 528/18; 528/19; 528/21; 528/22; 528/23
[58] Field of Search ........................ 528/12, 14, 15, 16, 528/17, 18, 19, 21, 22, 33; 525/477, 100, 474; 428/266, 447; 427/387

[56] References Cited

U.S. PATENT DOCUMENTS

| | | | |
|---|---|---|---|
| 2,624,749 | 1/1953 | Bunnell | 528/12 |
| 2,810,704 | 10/1957 | Krantz | 528/901 |
| 3,536,749 | 10/1970 | Groves | 260/481 |
| 3,675,899 | 4/1971 | Pryor | 260/17.4 |
| 3,708,537 | 1/1973 | Groves | 260/556 |
| 4,436,856 | 3/1984 | Huhn | 524/211 |
| 4,717,599 | 1/1988 | Merrill | 525/477 |

OTHER PUBLICATIONS

Heslop, et al. "Inorganic Chemistry–A Guide to Advanced Study," Elsevier Scientific Publishing Co. New York, pp. 242 and 243, 1976.

Primary Examiner—Melvyn I. Marquis

[57] ABSTRACT

Organopolysiloxane resin blended with alkyl-alkoxypolysiloxane resin plus a condensation catalyst is found to have reduced soil retention. Optionally, there may be added perfluoroalkyl resin for improved oil and water repellency.

26 Claims, No Drawings

FABRIC COATING

The present invention relates to the treatment of fabrics for water repellency. More particularly, the present invention relates to silicone compositions suitable to render fabrics water repellent and to reduce dirt retention upon cleaning.

BACKGROUND OF THE INVENTION

Silicones have been widely employed to render fabrics water repellent. Presently they are applied to clothing, carpeting, window coverings, furniture, car seats, etc. to protect the fabrics from water-borne stains.

Various fabrics and various weaves benefit more of less in water repellency from the application of silicone. For example, unsized, tightly woven cotton materials have good water repellency with the application of silicones. In contrast, loosely woven shag materials with high loft benefit less in water repellency with silicone application. In either case at least some benefit is obtained. However, regardless of the degree of water repellency obtained, soil or dirt retention increases in proportion with the amount of silicone applied.

One prior art silicone fabric treatment composition is reported to contain by weight 30 parts of a composition having 55 to 60% by weight MDQ and MQ resins in organic solution, 18 parts of a branched silanol stopped fluid, having a viscosity of 15 to 40 centistokes and being the condensation product of D and T units in a weight ratio of 3/1, 14.5 parts of a titanate catalyst and 36 parts mineral spirits. This composition has excellent water repellency but increases soil and dirt retention of the fabric.

Another prior art silicone fabric treatment composition is reported to contain by weight 34 parts of a composition having 50 to 60% by weight MQ and condensed MQ resins in organic solution, 11.5 parts of a 3,000 centistoke silanol stopped silicone polymer, 35.5 parts of a branched silanol stopped fluid having a viscosity of 15 to 40 centistokes and being the condensation product of D and T units in a weight ratio of 3/1, 34 parts of titanate catalyst, and 100 ppm perfluoroalkylpolyether for antifoam.

In addition to silicone compositions, perfluoroalkyl resins diluted with various solvents including 1,1,1-trichloroethane have been used in fabric treatment. The perfluoroalkyl resins provide excellent oil resistance but are generally less water repellent than silicones and are relatively more expensive.

Thus, it is an object of the present invention to produce a silicone fabric treatment composition having reduced soil or dirt retention.

It is another object of the present invention to produce a silicone fabric treatment composition having improved oil resistance.

It is yet another object of the present invention to treat fabrics with these compositions.

SUMMARY OF THE INVENTION

Briefly, according to the present invention, there is provided a silicone composition for treating fabric comprising:

(a) 100 parts by weight an organopolysiloxane resin selected from the group consisting of resins having $R_3SiO_{0.5}$ units and $SiO_2$ units, the ratio of $R_3SiO_{0.5}$ to $SiO_2$ ranging from about 0.2 to about 0.9:1 (e.g. MQ resins), and resins having $R_3SiO_{0.5}$ units, $R_2SiO$ units, and $SiO_2$ units, the ratio of $R_3SiO_{0.5}$ units to $SiO_2$ ranging from about 0.2 to about 0.9:1 and the ratio of $R_2SiO$ units being up to about 0.1:1 (e.g. MDQ resins), where each R is independently selected from substituted or unsubstituted monovalent hydrocarbon radicals from 1 to about 8 carbon atoms;

(b) 5 to 500 parts by weight an alkylalkoxypolysiloxane resin for each 100 parts by weight organopolysiloxane resin said alkyl-alkoxypolysiloxane having greater than 50% by number units of the formula:

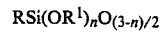

$$RSi(OR^1)_nO_{(3-n)/2}$$

wherein n is 0.1 or 2 and $R^1$ is a substituted or unsubstituted hydrocarbon radical of from 1 to 6 carbon atoms and R is a substituted or unsubstituted hydrocarbon radical of from 1 to 8 carbon atoms; and (c) an effective amount of condensation catalyst.

Optionally, there may be included within this composition an alkoxy crosslinking agent.

DESCRIPTION OF THE INVENTION

Suitable organopolysiloxane resin for use herein is selected from the group consisting of resins containing $R_3SiO_{0.5}$ units and $SiO_2$ units, the ratio of $R_3SiO_{0.5}$ to $SiO_2$ ranging from about 0.2 to about 0.9:1 and resins containing $R_3SiO_{0.5}$ units, $R_2SiO$ units, and $SiO_2$ units, the ratio of $R_3SiO_{0.5}$ units to $SiO_2$ units ranging from about 0.2 to about 0.9:1 and the ratio of $R_2SiO$ units to $SiO_2$ units being up to about 0.1:1; where each R is a substituted or unsubstituted monovalent hydrocarbon radical from 1 to about 8 carbon atoms, including alkyl radicals, aryl radicals, alkaryl radicals, aralkyl radicals, cycloalkyl radicals, or alkenyl radicals. Preferably all of the R groups are methyl.

Methods for preparing such organopolysiloxane resins are well known in the art, for example, as described in U.S. Pat. Nos. 2,398,672 to Sauer, 2,676,182 to Daudt et al., 2,736,721 to Dexter, and 2,857,356 to Goodwin, Jr., all of which are incorporated by reference into the present disclosure. Other methods for preparing resins of this type will be apparent to those of ordinary skill in the art.

These resins generally are hydroxy substituted due to the fact that unreacted hydroxy remains following condensation of silanols in their manufacture. Of course, the hydroxy substitution could easily be alkoxy substitution which would also be suitable for use herein. Degree of condensation or molecular weight is usually determinative of hydroxy or alxoxy content. It is preferred that the organopolysiloxane resins have a hydroxy or alkoxy content equivalent ranging from about 1 to about 6% by weight.

Alkyl-alkoxypolysiloxane resins contemplated for use in the present invention with hydrolysis and condensation contain greater than 50% by number units of the general formula:

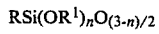

$$RSi(OR^1)_nO_{(3-n)/2}$$

where n is 0, 1, 2; $R^1$ is a substituted or unsubstituted hydrocarbon radical of from 1 to 6 carbon atoms, preferably methyl; R is a substituted or unsubstituted monovalent hydrocarbon radical of from 1 to 8 carbon atoms preferably methyl; and fewer than 20% by number of all siloxane units are $SiO_2$ units. Preferably, the alkylalkoxypolysiloxane resins contain greater than 80% by number units of the above formula.

The alkyl-alkoxypolysiloxane resins may be produced as an alkoxy resin or fluid, i.e. through the condensation of alkoxy substituted silanes, or such resins may be produced as hydroxy substituted polymers and capped with an alkoxy substituted silane. Well known capping silanes are methyltrimethoxysilane, methyltriethoxysilane, ethyltrimethoxysilane, tetraethoxysilane, vinyltrimethoxysilane, etc. The uses of these capping silanes are well known, such as found in U.S. Pat. No. 4,515,932 and others, hereby incorporated by reference.

Preferred alkyl-alkoxypolysiloxanes have upon hydrolysis and condensation the empirical formula:

$$RSi(OR^1)_nO_{(3-n)/2}$$

wherein n is a number from about $\frac{1}{3}$ to about 1 and R and $R^1$ are defined above. Where n is slightly more than 1, some organopolysiloxane units will be in the form of rings and some in the form of chains. Where n is exactly 1, the organopolysiloxane units will be in a ring containing six or more members. Where n is less than 1, the organopolysiloxane units will be in the form of rings or chains of rings. These alkoxypolysiloxanes are oils which show little viscosity change with moderate heating. Preferably R is methyl. Suitable non-linear alkyl-alkoxypolysiloxanes are described in U.S. Pat. Nos. 2,624,749 to Bunnell and 2,810,704 to Krantz, both of which are incorporated by reference. Methylmethoxypolysiloxane resins of Krantz, are available from General Electric Company under the trademark DF 104. Other suitable alkyl-alkoxypolysiloxane resins will be obvious to the artisan or their suitability can be ascertained without undue experimentation.

For each 100 parts by weight organopolysiloxane resin, there should be used from about 5 to about 500 parts by weight alkyl-alkoxypolysiloxane and preferably about 5 to about 100 parts by weight. The viscosity of the alkyl-alkoxypolysiloxane should vary between about 10 and 10,000 centipoise at 25° C. Preferably viscosity should vary between about 50 and 1000 centipoise.

The condensation catalyst used herein may be a Lewis acid; a primary, secondary, or tertiary organic amine; a combination of Lewis acid and organic amine; a metal oxide; titanium compounds; tin compounds; or zirconium compounds. These catalysts will facilitate the condensation reaction of hydroxy with hydroxy, hydroxy with methoxy, or methoxy with methoxy and thus promote cure.

Suitable titanium compounds include, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition, betadicarbonyltitanium compounds as shown by Weyenberg, U.S. Pat. No. 3,334,067 can be used as condensation catalysts in the present invention.

Suitable tin compounds are, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Zirconium compounds are exemplified by zirconium octoate. Further examples of metal condensation catalysts are, for example, lead 2-ethyloctoate, iron 2-ethyloctoate, cobalt 2-ethyloctoate, antimony octoate, bismuth napthenate, zinc napthenate, zinc sterate and certain metal oxides.

The above titanium, tin, zirconium, and other metal condensation catalysts should be added in concentrations of from about 0.001 to 2 parts by weight metal to 100 parts by weight of organopolysiloxane resin and alkyl-alkoxypolysiloxane. To be best effective, such catalysts should be in a form to render them silicone soluble.

By broad definition, Lewis acids include Lowry-Bronsted acids and are considered to be any compound which is an electron acceptor. Specifically, Lewis acids are anhydrides, such as, acetic anhydride, propionic anhydride, butyric anhydride, etc.; acetyl silanes, such as, methyltriacetylsilane, ethyltriacetylsilane, dimethyldiacetylsilane, etc.; organic acids, such as, formic acid, acetic acid, propionic acid, butyric acid, succinic acid, trichloroacetic acid, etc.; inorganic acids, such as, hydrochloric acid, sulfuric acid, phosphoric acid, nitric acid, iodic acid, etc.; and more traditional Lewis acids, such as, aluminum trichloride, barium sulfate, boron tribromide, iron chloride, etc.

Suitable amine compounds are primary, secondary, or tertiary amines which may be silylated or otherwise complexed. The more basic the amine, the more effective it is as a catalyst. Examples of preferred amines that can be used within the scope of the instant invention are for instance:

$(Me_2N)_2—C=NC_3H_7Si(OCH_3)_3$
$(Me_2N)_2—C=NC_4H_9$
$H_2NC_3H_7Si(OEt)_3$
$H_2NC_3H_7Si(OCH_3)_3$
$H_2NC_3H_7NC_3H_7Si(OCH_3)_3$
Tetramethylpiperidine
Piperidine
1,4-Diazabicyclo[2.2.2]octane
N-Methylmorpholine
N,N-Dimethylethylenediamine
N-Methylpiperidine
N-hexylamine
Tributylamine
Dibutylamine
Cyclohexylamine
Di-n-hexylamine
Triethylamine
Benzylamine
Dipropylamine
N-ethylphenylamine The amine catalyst may be integrated with the aforementioned capping silanes or the below mentioned crosslinking agents to produce an integrated crosslinking catalyst. An example of such a dual purpose compound is gamma-aminopropyltrimethoxysilane.

Combinations of Lewis acids and amines provide a synergistic effect and thus are particularly desirable. Lewis acids and amines are effective catalysts when present anywhere from about 0.1 parts by weight to about 10 parts by weight to 100 parts by weight polyorganosiloxane resin and alkyl-alkoxypolysiloxane.

Within the previously set forth weight ranges it is essential to the present invention that sufficient alkylalkoxypolysiloxane be added to the organopolysiloxane resin that a film is formed on a surface to which the mixture is applied. Generally, the organopolysiloxane resin will dry to a powder but in combination with sufficient alkyl-alkoxypolysiloxane resin, a surface film will form.

Given that sufficient alkyl-alkoxypolysiloxane is present to form a surface film, there should be sufficient alkoxy present with catalyst to crosslink the film to a dry, tack free surface but not so much alkoxy present the film is overcured. The alkoxy is, of course, present in the alkyl-alkoxypolysiloxane or polyorganosiloxane resin, and the catalyst will crosslink these sites to cure the film. Where there is insufficient alkoxy present, further alkoxy may be supplied in mixture by adding from about 1 to about 15 parts by weight to 100 parts by weight polyorganosiloxane resin and alkyl-alkoxypolysiloxane, crosslinking agents which are the capping silanes discussed above. As a measurement of desired cure, the film should not be cured or curable to the point that it is no longer soluble in common organic solvents such as xylene, toluene, or mineral spirits. The silicone is desirably removable with only brief exposure to common organic solvents, i.e. dry cleaning solvents. Thus, where a catalyst is employed that is "too hot" or does not migrate from the film and the composition contains a substantial amount of unreacted alkoxy functionality, the coating will over cure. Persons skilled in the art are able to judge to what degree the composition should be cured and the various factors which control cure to obtain a film of the appropriate characteristics.

The compositions of the present invention may be applied as a solution in mineral spirits and non bleaching organic solvents at from about 1 to about 50% by weight solids. Means of application include brushing, spraying, and the like. Organic solvents such as xylene and toluene may effect color fastness and thus are not desirable. The composition is applied at from 2 to 10% by weight solids in an amount to obtain a sufficient coverage for water repellency. Generally there should be applied from about 0.1 to about 5.0 grams of solids/m$^2$ of fabric.

The instant composition may be blended with perfluoroalkyl resins to obtain oil resistance and surprisingly increased water repellency. A preferred perfluoroalkyl resin includes adducts of perfluorocarbon amides with the unsaturated double bond of an acrylate or methacrylate ester, as disclosed in U.S. Pat. No. 3,536,749. Another preferred perfluoroalkyl resin includes adducts of an alcohol functional perfluoroalxyl group with an organic isocyanate or polyisocyanate, for example phenylisocyanate, as disclosed in U.S. Pat. No. 3,575,899. Another preferred perfluoroalkyl resin is an adduct of perfluorocarbon amides with the unsaturated double bond of a vinyl sulfone, for instance $C_2H_5SO_2CH=CH_2$ or $C_6H_5SO_2CH=CH_2$, as shown in U.S. Pat. No. 3,708,537. The alcohol functional perfluoroalxyl or the perfluorocarbon amide may contain intervening structures such as alkylene, arylene, oxa, imino, sulfanamido, carbonamido, and the like. Suitable alcohol functional perfluoralkyl are, for example, $CF_3(CF_2)_6SO_2CH_2CH_2OH$, $CF_3(CF_2)_6COCH_2$-$H_2OH$, and $CF_3(CF_2)_6CON(C_2H_5)C_2H_4OH$. Suitable perfluorocarbon amides are, for example, $C_8F_{17}SO_2NH_2$, $C_{24}F_{49}CON(CH_3)H$ and $[H(C_2H_5)NOCC_2F_4]_2O$. These resins may be diluted in a variety of solvents including mineral spirits and trifluoroethane.

The perfluoroalkyl resins are generally added to the silicone composition in a solids ratio to the organopolysiloxane resin and alkyl-alkoxypolysiloxane resin of from about 1/10 to about 10/1. The preferred such ratio is from about 1/5 to about 1/1. Total solids should be maintained at the levels stated above for the silicone composition alone. The U.S. Pat. Nos. cited above in regard to the perfluoroalkyl resins are hereby incorporated by reference.

In order to better enable the artisan to practice the present invention, the following examples are provided by way of illustration and not by way of limitation. All parts and percentages are by weight unless otherwise noted.

EXAMPLES

Preparation of Alkyl-alkoxypolysiloxane

Alkyl-alkoxypolysiloxane resin is prepared having the formula:

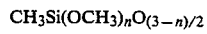

$$CH_3Si(OCH_3)_nO_{(3-n)/2}$$

by treating methyltrichlorosilane in the absence of water and in the presence of a water insoluble inert solvent with methanol in an amount equal to from 1 to less than 3 moles methanol per mole of methyltrichlorosilane, the by product HCl being retained in the reaction mixture. The alkoxylated silane is subsequently hydrolyzed by adding a mixture of methanol and water in which the water is present in an amount equal to from 1.15 to 1.33 moles per mole of methyltrichlorosilane originally used and the amount of methanol being from 25 to 75% of the total amount of total methanol added. Following hydrolysis, the silane is allowed to condense in the presence of the hydrogen chloride dissolved in the reaction mixture. The resultant resin is isolated from the liquid system and has a value of n equal to from $\frac{1}{3}$ to 7/10. Residual HCl is present in an unknown amount.

Preparation of Siloxane Composition A 70 parts by weight organopolysiloxane resin, at 60% solids in xylene, composed of $(CH_3)_3 SiO_{0.5}$ units and $SiO_2$ units in a ratio of 0.8:1 was combined with 30 parts by weight alkyl-alkoxypolysiloxane above and 0.6 parts of gamma-aminopropyltriethoxysilane catalyst. The resulting mixture was reduced to 10% solids in mineral spirits.

1 part at 10% solids was added to 1 additional part odorless mineral spirits to give a composition at 5% solids.

Preparation of Comparative Siloxane Composition B 8 parts by weight of 55% solids MQD resin in xylene 22.2 parts by weight of a 60% solids MQ resin in xylene, 12.6 parts by weight of a silanol stopped DT resin with 25% by number T units are mixed with 32.8 parts mineral spirits and 1.4 parts inhibitor. Subsequently, 14.5 parts tetraisopropyl titanate are added and the composition agitated until homogeneous. Solids are adjusted with the addition of 3.5 parts mineral spirits, to give about 50% solids including catalyst. 1 part at 50% solids was added to 9 additional parts odorless mineral spirits to give a composition at 5% solids.

Preparation of Siloxane Composition and Comparative Siloxane Composition with Perfluorosilicone Resin A perfluorosilicone resin at 5% solids in 1,1,1-trichlorethane was blended in a 1/1 weight ratio with both the Siloxane Composition A and Comparative Siloxane Composition B to form Compositions C and D respectively.

EXAMPLES 1–4

Close knap pile carpeting, bleached white in color with no sizing or treatment was divided into five sections and, except for control area, was treated with 1½–2 grams solids/ft$^2$ of Compositions A–D above. Initial oil and water repellency were observed. The carpet was then placed for two weeks in a doorway with about 250 entries and 250 exits a day. The carpet was removed from the doorway and cleaned with a 1% solution of dodecyl sodium laurel sulfate and rinsed.

TABLE 1

| Composition | Initial Water Repellency | Initial Oil Repellency | Soil Retention After cleaning |
| --- | --- | --- | --- |
| Control | Bad | Bad | Off white with light gray areas |
| A | Good | Bad | Light gray with lighter off white areas |
| B | Good | Bad | Dark gray with patches of brown stain |
| C | Good | Good | Light gray with patches of dark gray |
| D | Good | Good | Uniform dark gray |

EXAMPLES 5–8

An untreated, nylon suede fabric with a velvet-like texture, camel in color, was treated with Compositions A–D at 2.0–2.5 grams solids/ft$^2$. The treated samples and control were subjected to ASTM 5526 for water repellency and tested for mineral oil repellency. ASTM 5526 measures the unwetted surface area of a 6 inch diameter specimen exposed at a 45° angle for 25 to 30 seconds to a spray of about 250 ml of water from 6 inches above the sample. The test procedure for mineral oil repellency was to place drops of mineral oil on surface and observe wetting for one day.

TABLE 2

| Composition | Water Repellency ASTM-5526 | Mineral Oil Repellency |
| --- | --- | --- |
| Control | 50 | Immediate wet through |
| A | 80 | Immediate wet through |
| B | 90 | Immediate wet through |
| C | 100 | No wet through |
| D | 100 | No wet through |

What is claimed is:

1. Fabric of natural or synthetic fibers treated by application with sufficient silicone composition for water repellency, said silicone composition comprising:
    (a) organopolysiloxane resin selected from the group consisting of resins having $R_3SiO_{0.5}$ units and $SiO_2$ units, the ratio of $R_3SiO_{0.5}$ to $SiO_2$ ranging from about 0.2 to about 0.9:1 and resins having $R_3SiO_{0.5}$ units, $R_2SiO$ units, and $SiO_2$ units, the ratio of $R_3SiO_{0.5}$ units to $SiO_2$ ranging from about 0.2 to about 0.9:1 and the ratio of $R_2SiO$ units being up to about 0.1:1 where each R is a substituted or unsubstituted monovalent hydrocarbon radicals from 1 to about 8 carbon atoms;
    (b) 5 to 500 parts by weight an alkylalkoxypolysiloxane resin for each 100 parts by weight organopolysiloxane resin said alkyl-alkoxypolysiloxane having greater than 50% by number units of the formula:

$$RSi(OR^1)_nO_{(3-n)/2}$$

wherein n is 0.1 or 2 and $R^1$ is a substituted or unsubstituted hydrocarbon radical of from 1 to 6 carbon atoms and R is a substituted or unsubstituted hydrocarbon radical of from 1 to 8 carbon atoms; and
    (c) an effective amount of condensation catalyst.

2. The treated fabric of claim 1 in which said silicone composition further contains from about 1 to about 15 parts by weight of crosslinking agent to 100 parts by weight polyorganosiloxane resin and alkyl-alkoxypolysiloxane.

3. The treated fabric of claim 2 wherein said crosslinking agent is methyl trimethoxy silane.

4. The treated fabric of claim 2 wherein said crosslinking agent and said catalyst is gamma-aminopropyl-trimethoxysilane.

5. The treated fabric of claim 1 wherein said silicone composition comprises from about 5 to about 100 parts by weight alkyl-alkoxypolysiloxane for each 100 parts by weight organopolysiloxane resin.

6. The treated fabric of claim 1 wherein the alkyl-alkoxypolysiloxane has the empirical formula:

$$RSi(OR^1)_nO_{(3-n)/2}$$

wherein n is a number from about ⅛ to about 1, $R^1$ is a substituted or unsubstituted hydrocarbon radical of from 1 to 6 carbon atoms and R is a substituted or unsubstituted hydrocarbon radical of from 1 to 8 carbon atoms.

7. The treated fabric of claim 1 wherein R and $R^1$ are methyl.

8. The treated fabric of claim 1 wherein said organopolysiloxane resin has a hydroxy or alkoxy content ranging from about 1 to about 6% by weight.

9. The treated fabric of claim 1 wherein said condensation catalyst is selected from the group consisting of a Lewis acid, an organic amine, a combination of Lewis acid and organic amine, and metal oxide.

10. The treated fabric of claim 1 treated with from about 0.1 g/m$^2$ to 5.0 g/m$^2$ said silicone composition solids.

11. The treated fabric of claim 1 wherein said silicone composition further comprises a perfluoralkyl resin selected from the group containing of adducts of perfluorocarbon amides with the unsaturated double bond of an acrylate or methacrylate ester, adducts of an alcohol functional perfluoroalkyl group with an organic isocyanate or polyisocyanate, and adducts of perfluorocarbon amides with the unsaturated double bond of a vinyl sulfone.

12. The treated fabric of claim 11 wherein said condensation catalyst is an organic amine.

13. The treated fabric of claim 11 wherein the weight ratio of perfluoroalkyl resin to organopolysiloxane resin and alkylalkoxypolysiloxane resin varies from about 1/10 to about 10/1 on a weight basis.

14. The treated fabric of claim 11 wherein said perfluoroalxyl resin is selected from the group consisting of adducts of perfluorocarbon amides with the unsaturated double bond of an acrylate or methacrylate ester, adducts of alcohol functional perfluoroalkyl group with organic isocyanate or polyisocyanate, and adducts of a perfluorocarbon amide with the unsaturated double bond of a vinyl sulfone.

15. A silicone composition comprising:
(a) organopolysiloxane resin selected from the group consisting of resins having $R_3SiO_{0.5}$ units and $SiO_2$ units, the ratio of $R_3SiO_{0.5}$ to $SiO_2$ ranging from about 0.2 to about 0.9:1 and resins having $R_3SiO_{0.5}$ units, $R_2SiO$ units, and $SiO_2$ units, the ratio of $R_3SiO_{0.5}$ units to $SiO_2$ ranging from about 0.2 to about 0.9:1 and the ratio of $R_2SiO$ units being up to about 0.1:1 where each R is a substituted or unsubstituted monovalent hydrocarbon radicals from 1 to about 8 carbon atoms;
(b) 5 to 500 parts by weight an alkylalkoxypolysiloxane resin for each 100 parts by weight organopolysiloxane resin said alkyl-alkoxypolysiloxane having greater than 50% by number units of the formula:

$$RSi(OR^1)_nO_{(3-n)/2}$$

wherein n is 0.1 or 2 and $R^1$ is a substituted or unsubstituted hydrocarbon radical of from 1 to 6 carbon atoms and R is a substituted or unsubstituted hydrocarbon radical of from 1 to 8 carbon atoms; and
(c) an effective amount of condensation catalyst;
(d) a perfluoroalkyl resin selected from the group consisting of adducts of perfluorocarbon amides with the unsaturated double bond of an acrylate or methacrylate ester, adducts of an alcohol functional perfluoroalkyl group with an organic isocyanate or polyisocyanate, and adducts of perfluorocarbon amides with the unsaturated double bond of a vinyl sulfone, wherein the weight ratio of perfluoroalkyl resin to organopolysiloxane resin and alkyl-alkoxypolysiloxane varies from about 1/10 to about 10/1 on a weight basis; and
(e) a sufficient amount of solvent to form a solution of from about 1 to about 50% by weight solids.

16. The composition of claim 15 wherein said solvent forms a solution of from about 2 to about 10% by weight solids.

17. The composition of claim 15 wherein said solvent is mineral spirits.

18. The composition of claim 15 which further contains from about 1 to about 15 parts by weight of crosslinking agent to 100 parts by weight polyorganosiloxane resin and alkyl-alkoxypolysiloxane.

19. The composition of claim 18 wherein said crosslinking agent is methyl trimethoxy silane.

20. The composition of of claim 18 wherein said crosslinking agent and said catalyst is gamma-aminopropyltrimethoxysilane.

21. The composition of claim 15 wherein said silicone composition comprises from about 5 to about 100 parts by weight alkyl-alkoxypolysiloxane for each 100 parts by weight organopolysiloxane resin.

22. The composition of claim 15 wherein the alkyl-alkoxypolysiloxane has the empirical formula:

$$RSi(OR^1)_nO_{(3-n)/2}$$

wherein n is a number from about $\frac{1}{3}$ to about 1, $R^1$ is a substituted or unsubstituted hydrocarbon radical of from 1 to 6 carbon atoms and R is a substituted or unsubstituted hydrocarbon radical of from 1 to 8 carbon atoms.

23. The composition of claim 15 wherein R and $R^1$ are methyl.

24. The composition of claim 15 wherein said organopolysiloxane resin has a hydroxy or alkoxy content ranging from about 1 to about 6% by weight.

25. The composition of claim 15 wherein said condensation catalyst is selected from the group consisting of a Lewis acid, an organic amine, a combination of Lewis acid and organic amine, and metal oxide.

26. The composition of claim 15 wherein said condensation catalyst is an organic amine.

* * * * *